Patented Dec. 23, 1952

2,622,983

UNITED STATES PATENT OFFICE 2,622,983

METHOD OF PROCESSING AND CANNING WHOLE SWEET MILK

Lloyd T. Winger, Sr., Trinidad, Colo.

No Drawing. Application September 22, 1950, Serial No. 186,310

12 Claims. (Cl. 99—54)

The present invention relates generally to processing and canning whole sweet milk and more particularly to a new and improved method of treating whole sweet milk to produce a sterilized and stabilized whole sweet milk product which requires no refrigeration and which will keep in any climate at room temperature for indefinite periods of time.

In the past, various treatments and processes have been developed for the purpose of inhibiting spoilage of dairy products and to inhibit the tendency of many of these products to develop off flavors. Such treatments include, for example, various applications of refrigeration, heat sterilization, introduction of small amounts of special chemicals, use of low temperature vacuum evaporation when producing concentrates, and use of various types of sealed containers. While such treatments have greatly improved the quality of dairy products, it is recognized by the industry that many dairy products could be further improved with respect to palatability and flavor, and that conventional processing to make possible preservation over long periods, is accompanied by a substantial amount of impairment in palatability and flavor. For example, canned evaporated milk as produced today by conventional processes has a very noticeable cooked flavor, and many of its ingredients are materially altered by the processing steps applied.

It is an object of the present invention to provide a process which is capable of producing whole sweet milk of improved quality and particularly characterized by improved flavor.

Another object of the invention is to provide a process for treating whole sweet milk to produce a product having inordinate keeping qualities as compared with those products produced by prior workers in this art.

Further objects of the invention will appear from the following description in which a preferred and critical embodiment has been set forth in detail.

It has been found, in accordance with the present invention, that the production of whole sweet milk sterilized and stabilized against subsequent deterioration may be accomplished only by carrying out certain procedural details which are highly critical in their nature and chronological sequence and which must be observed with meticulous detail to achieve optimum results.

As is conventional in milk processing generally, high quality whole sweet milk produced on farms under rigid sanitary regulations is gathered by milk haulers in refrigerated milk trucks or delivered by producers themselves to a central milk processing plant, where the milk is weighed, sampled, and graded for quality and flavor by experienced milk plant operators. After this preliminary processing, the whole sweet milk is ready for processing in accordance with the present invention.

The milk is first tested for butterfat content with a Babcock tester and standardized to 3.5%–4% B. F. content, depending upon local legal requirements.

The milk is then preheated to a temperature of 100° F. to 140° F., preferably between 100° F. and 110° F., whereupon it is passed into and through conventional clarifiers and/or filters to remove any foreign substances which may be in the milk. During this clarification and filtration process the temperature of the milk will drop.

The clarified and filtered milk, which is now comparatively cool, is passed into a conventional pasteurizing vat where the milk is subjected to pasteurization.

After pasteurization, the milk is again reheated to a temperature of approximately 80° F. at which temperature a particular additive is blended with the milk. The blending of the particular additive at this point in the process, and the formulation of this particular additive, is considered the most important and critical feature for the successful preservation and sterilization of the milk. The specific additive is a mixture consisting of 2 ounces of hydrogen peroxide and 2 ounces of milk sugar for each 100 gallons or 860 lbs. of whole milk, based on 3.5% butterfat. Neither hydrogen peroxide nor milk sugar should be used alone. Only the combination in the proportions indicated will achieve the objects of the invention.

After this particular and specific mixture of hydrogen peroxide and milk sugar is added, the temperature of the milk is raised to 140°–160° F., and kept at this temperature for a period of 30 to 60 minutes, while the mixture is subjected to constant gentle agitation. Optimum results are achieved at this point of the process by maintaining the milk and blended additive at a temperature of 142°–144° F. for a period of 30–35 minutes.

The thus treated milk is then run through a homogenizer at a pressure of 2500–3500 lbs., and preferably 3000–3500 lbs. This is considered the second critical point in the process since milk solids and fats must be properly broken down to obtain optimum results.

After adequate homogenization, the milk is subjected to rapid cooling to 35°–50° F., and preferably to 35°–45° F., by subjecting the same to direct expansion cooling or vacuum pasteurizer plate cooling, after which it is transferred to pressure holding tanks. The processed milk is then ready for the canning and sterilization process.

In canning the whole milk, sterilization of equipment is extremely important since milk must be transferred to cans and sealed in a strictly sanitary condition.

In accordance with the invention, the milk is transferred from the pressure holding tanks through stainless steel pipes into plunger type vacuum tin can filling machines and thence to tin can sealers which seal the lids tightly on tin cans of any desired size.

The cans are then placed in crates which, in turn, are placed in an automatic steam controlled retort sterilizer equipped with means for revolving the crates therein. The crates are revolved, thus keeping the milk in the cans in motion. Steam is applied under pressure of 2 to 15 lbs. for a period of 30 to 60 minutes when the flow of steam is discontinued. Optimum results are obtained when employing a steam pressure of 5 to 8 lbs. for a period of 30 to 35 minutes. The retort is then filled to approximately ½ its capacity with cold water while the inner part of the retort is kept revolving, thus cooling the milk in the cans. After the retort has run for 5 to 10 minutes, the water is drained off and additional cold water fed in, the retort being allowed to revolve another 5 to 10 minutes depending upon the coldness of the water. Rapid cooling of the milk in cans at this point to 35°–40° F. provides better flavor in the finished product.

The water is then drained from the retort, the crates removed therefrom and packed into shipping containers for the market.

In this processing and canning method it is preferred to use raw milk of grade C quality or above, according to U. S. Public Health Service Milk Ordinance and Code may be utilized for preservation. The higher the quality of the milk used from a bacteriological standpoint, the lower will be the amount of heat necessary in the sterilization process, to produce a sterile product, free of an objectionable cooked flavor.

Thru this process, whole sweet milk will be available to the consumer in a sanitary edible condition; the milk keeping indefinitely without refrigeration and eliminating glass and paper containers.

Any quantity can be purchased at a time and milk of a uniform quality will be available for use at all times.

The product is to be used particularly by the Armed Forces of the United States, and to promote the growth of children, and for school lunches, picnics, camping trips, baking of foods, precise confection making, and for many other purposes where whole sweet milk is used and uniform quality is required.

What I claim is:

1. In a process for sterilizing and stabilizing whole sweet milk, the step of blending with said milk an additive consisting of 2 ounces of .1% to .2% by weight of an edible grade of 35% hydrogen peroxide and 2 ounces of milk sugar per 100 gallons of milk.

2. In a process for sterilizing and stabilizing whole sweet milk, the step of blending with said milk at a temperature of 80° F. an additive consisting of 2 ounces of hydrogen peroxide and 2 ounces of milk sugar per 100 gallons of milk.

3. In a process for sterilizing and stabilizing whole sweet milk, the steps of blending with said milk at a temperature of 80° F. an additive consisting of 2 ounces of .1% to .2% by weight of an edible grade of 35% hydrogen peroxide and 2 ounces of milk sugar per 100 gallons of milk, heating the milk-additive mixture to 140°–160° F. and maintaining it at said temperature for 30–60 minutes.

4. In a process for sterilizing and stabilizing whole sweet milk, the steps of blending with said milk at a temperature of 80° F. an additive consisting of 2 ounces of hydrogen peroxide and 2 ounces of milk sugar per 100 gallons of milk, heating the milk-additive mixture to 142°–144° F. and maintaining it at said temperature for 30–35 minutes.

5. A process for sterilizing and stabilizing whole sweet milk which comprises heating the milk to 100°–140° F., filtering and clarifying the heated milk, pasteurizing the milk and then blending with the pasteurized milk an additive consisting of 2 ounces of hydrogen peroxide and 2 ounces of milk sugar per 100 gallons of milk.

6. A process for sterilizing and stabilizing whole sweet milk which comprises heating the milk to 100°–140° F., filtering and clarifying the heated milk, pasteurizing the milk and then blending with the pasteurized milk at a temperature of 80° F. an additive consisting of 2 ounces of hydrogen peroxide and 2 ounces of milk sugar per 100 gallons of milk.

7. A process for sterilizing and stabilizing whole sweet milk which comprises heating the milk to 100°–140° F., filtering and clarifying the heated milk, pasturizing the milk and then blending with the pasteurized milk at a temperature of 80° F. an additive consisting of 2 ounces of .1% to .2% by weight of an edible grade of 35% hydrogen peroxide and 2 ounces of milk sugar per 100 gallons of milk, heating the milk-additive mixture to 140°–160° F. and maintaining it at said temperature for 30–60 minutes.

8. A process for sterilizing and stabilizing whole sweet milk which comprises heating the milk to 100°–140° F., filtering and clarifying the heated milk, pasteurizing the milk and then blending with the pasteurized milk at a temperature of 80° F. an additive consisting of 2 ounces of hydrogen peroxide and 2 ounces of milk sugar per 100 gallons of milk, heating the milk-additive mixture to 142°–144° F. and maintaining it at said temperature for 30–35 minutes.

9. A process for sterilizing and stabilizing whole sweet milk which comprises heating the milk to 100°–110° F., filtering and clarifying the heated milk, pasteurizing the milk, reheating the milk to 80° F., blending with the milk at this temperature an additive consisting of 2 ounces of hydrogen peroxide and 2 ounces of milk sugar per 100 gallons of milk, heating the milk-additive mixture to 142°–144° F. and maintaining it at said temperature for 30–35 minutes while subjecting the mixture to gentle agitation, subjecting the thus treated milk to homogenization, rapidly cooling the milk, and then canning and sterilizing.

10. Condensed milk comprising pasteurized and homogenized milk containing an edible grade of hydrogen peroxide and lactose.

11. Condensed milk comprising pasteurized and homogenized milk containing an edible grade of 35% hydrogen peroxide and lactose.

12. In a process for sterilizing and stabilizing whole sweet milk, the step of blending with said milk an edible grade of 35% hydrogen peroxide and also the step of counteracting the hydrogen peroxide with lactose.

LLOYD T. WINGER, Sr.

REFERENCES CITED

The following references are of record in the file of this patent:

UNITED STATES PATENTS

| Number | Name | Date |
|---|---|---|
| 1,039,849 | Trudel | Oct. 1, 1912 |
| 1,140,717 | Rutter | May 25, 1915 |
| 2,053,740 | Reichert et al. | Sept. 8, 1936 |
| 2,125,398 | Reichert et al. | Aug. 2, 1938 |

FOREIGN PATENTS

| Number | Country | Date |
|---|---|---|
| 9,703 | Great Britain | of 1905 |

OTHER REFERENCES

"Milk," by P. G. Heineman, pub. by W. B. Saunders Co., 1919, pages 223 and 225.